Feb. 28, 1928.
T. AULMANN
1,660,589
GRAVEL WASHING MACHINE
Filed March 16, 1925
2 Sheets-Sheet 1
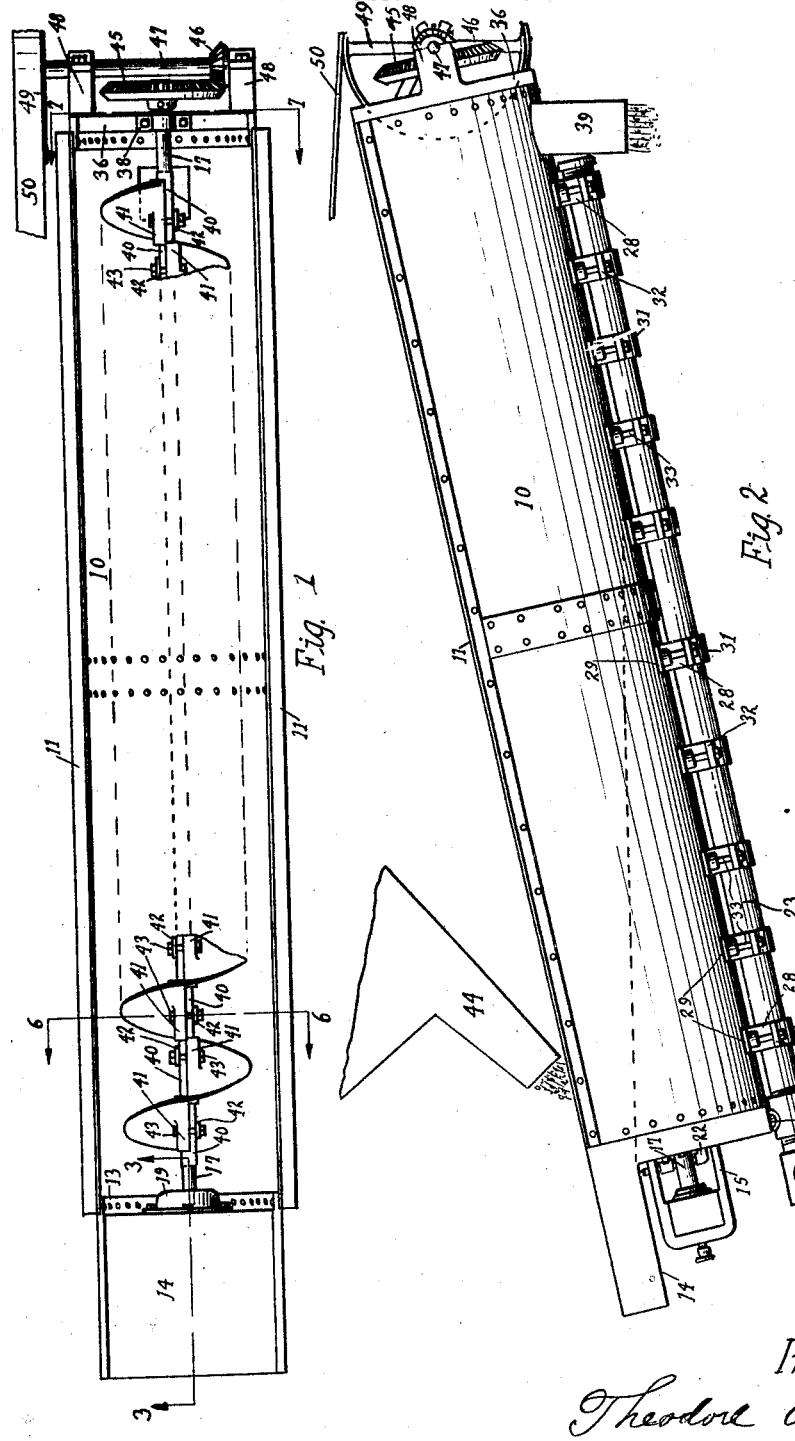
Inventor
Theodore Aulmann
by Ewing & Hague Attys.

Feb. 28, 1928.
T. AULMANN
1,660,589
GRAVEL WASHING MACHINE
Filed March 16, 1925    2 Sheets-Sheet 2
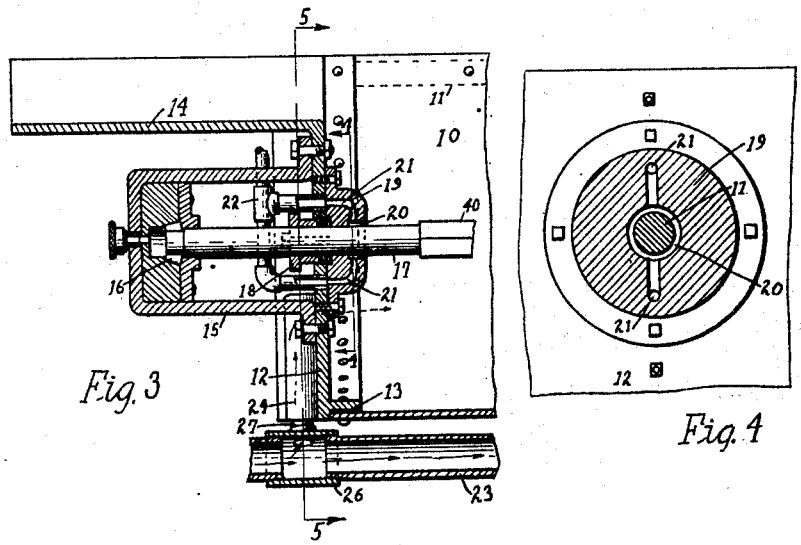
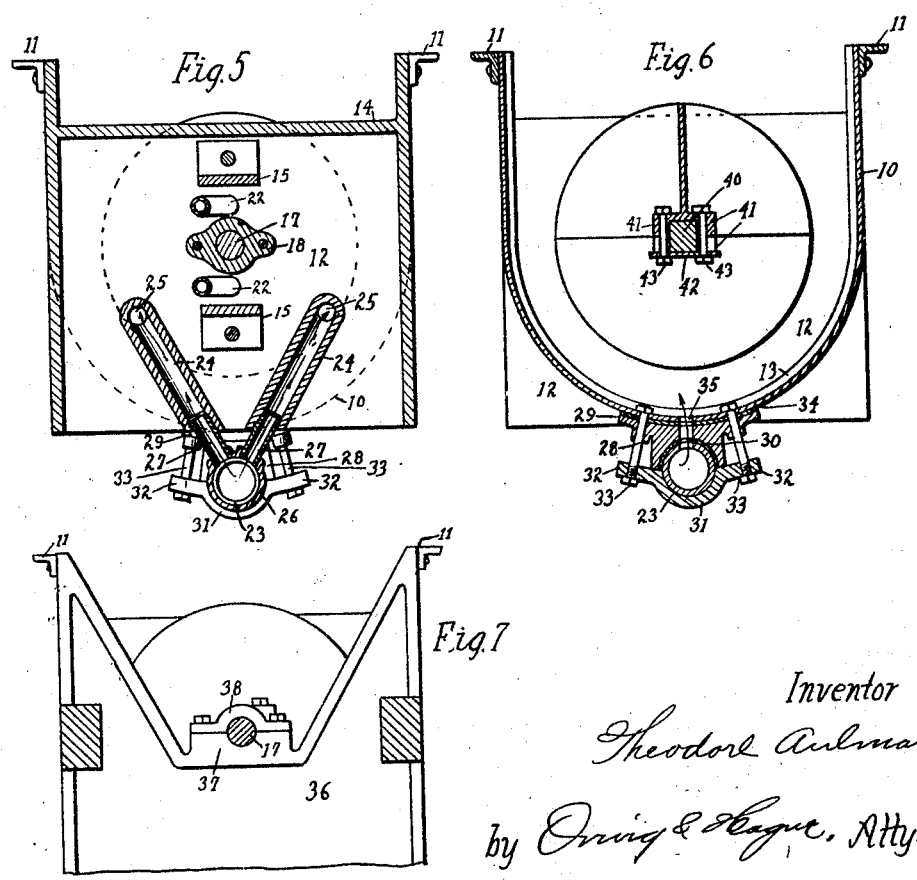
Inventor
Theodor Aulmann
by Irving & Hague, Attys.

Patented Feb. 28, 1928.

1,660,589

UNITED STATES PATENT OFFICE.

THEODORE AULMANN, OF DES MOINES, IOWA.

GRAVEL-WASHING MACHINE.

Application filed March 16, 1925. Serial No. 15,958.

The object of my invention is to provide a machine of simple, durable and inexpensive construction, especially designed for use in washing gravel, sand or the like of the kind commonly used for forming graveled roads and mixing with cement to form concrete. My machine is especially adapted for removing from such gravel such things as particles of wood, leaves, earth, clay, coal, shale and so forth.

More specifically it is my object to provide an improved body portion for the washer in which the main washer is formed of sheet metal, substantially U-shaped in cross section, and the ends or heads are cast and provided with suitable bearings, discharge openings and water passage-ways for ease and convenience in manufacture, and durability under the severe conditions imposed by use.

A further object is to provide improved means for mounting and supporting the main screw conveyor shaft and maintaining its main bearing free from sand and gravel and the like.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a machine embodying my invention, portions of the screw conveyor being removed and indicated by dotted lines.

Figure 2 shows a side elevation of a machine embodying my invention.

Figure 3 shows a vertical, sectional, detail view on the line 3—3 of Figure 1.

Figure 4 shows an enlarged, detail, sectional view on the line 4—4 of Figure 3.

Figure 5 shows a sectional view on the line 5—5 of Figure 3.

Figure 6 shows a sectional view on the line 6—6 of Figure 1; and

Figure 7 shows a sectional view on the line 7—7 of Figure 1.

Referring to the accompanying drawings, I have used the reference numeral 10 to indicate the sheet metal body portion of the tank, substantially U-shaped in cross section as shown in Figure 6, and preferably reinforced by angle bars 11 at its top edges. The lower head is preferably cast complete and comprises a body portion 12 having a flange 13 extended toward the center of the body portion and to which the sheet metal body portion 10 is riveted. At the top there is formed a tailings discharge spout 14.

Bolted to the rear central portion of the head 12 is a bearing box 15 projected rearwardly and formed with a thrust roller bearing device 16 designed to receive the screw shaft 17. This screw shaft passes through a relatively large opening in the head 12, and a packing gland 18 is screwed into said opening and surrounds the shaft. Bolted to the inner side of the head 12 is a thrust bearing device comprising a substantially flat circular body portion 19 having a circular opening through which the shaft 17 is projected and also having an enlarged cylindrical opening 20 at its forward end. This opening 20 communicates with a passageway 21 formed in the body 19 and communicating with these passageways are the water supply pipes 22 extended through the head 12. The advantages of this part of the device are as follows:

The device may be readily and easily assembled and the thrust bearing 16 is firmly supported and braced, adapting it to withstand the severe strains to which it is subjected when in use. The currents of water flow through the pipes 22, the passageways 21 and the cylindrical chamber 20 which will prevent all sand or gravel or the like from entering the packing gland 18 or the bearing 16, and when it is desired to remove the shaft the operator need only remove the part 19 and the packing gland 18, whereupon the shaft may be readily withdrawn from the thrust bearing longitudinally, and it may also have a slight up and down movement when being thus removed.

Supported directly beneath the body portion 10 is a water supply pipe 23 and water is conducted from the water supply pipe 23 to the interior of the body portion 10 near the head 12 by two water passageways 24, cast integral with the head 12 and having discharge openings 25 at their upper ends toward the interior of the tank. Mounted upon the pipe 23 is a pipe fitting 26 having two short pipes 27 screwed into it. These pipes 27 are also screwed into the ends of the water passageways 24, as clearly shown in Figure 5, thus forming a strong and durable connection from the main water supply to the interior of the tank near the lower end thereof.

At short intervals throughout the length of the main body portion of the tank I have provided for injecting streams of water from the pipe 23 upwardly through the bottom of the tank as follows: The reference numeral 28 indicates a cast fitting with its upper edge shaped to fit the bottom of the tank and provided with outwardly extended lugs 29. Its lower surface is rounded to fit the top edge of the pipe 23, and to provide a space for a gasket 30. A second fitting 31 is placed under the pipe 23 and is provided with outwardly extended lugs 32 through which bolts 33 may be passed. These bolts also extend through the tank and through the lugs 29. A gasket 34 is inserted between the fitting 28 and the bottom of the tank, and a water passageway 35 is extended through the fitting 28 and through the bottom of the tank, and obviously when bolts are drawn tight a strong and durable water-tight connection is provided from the pipe 23 to the interior of the tank.

The upper end of the tank is preferably formed complete of a single casting and is indicated generally by the reference numeral 36. Its upper central portion is open and provided with a bearing member 37 for the shaft 17, and a detachable bearing member 38 is bolted to the part 37. Obviously when this bearing member 38 is removed, the shaft may be removed by moving it longitudinally and upwardly. At the upper end of the body 10 there is a discharge spout 39 for washed gravel.

The screw proper is preferably formed of a series of screw conveyor sections, each made of a single casting comprising substantially a half circle. The body portion of the shaft is formed square as indicated at 40 in Figure 6, and each cast section of the screw conveyor is formed with flanges 41 which overlap the square shaft. A plate 42 is applied to the opposite side of the shaft and bolts 43 extend through the plate and through said flanges 41. A hopper 44 is provided for discharging the unwashed gravel into a washer body at its rear central portion.

Attention is called to the fact that the diameter of the screw conveyor is substantially less than the interior diameter of the tank, as clearly shown in Figure 6.

At the upper end of the shaft 17 is a bevel gear 45 in mesh with a small bevel pinion 46 on the shaft 47 mounted in suitable bearings 48 on the head 36, and on the said shaft 47 is a pulley 49 driven by a belt 50.

In practical operation, and assuming that the unwashed gravel is being fed to the device through the hopper 44, and assuming also that water is being fed to the tank through all of the water discharge openings, the operation of the device is as follows:

In that part of the device where there is a supply of water as indicated by the dotted lines in Figure 2, then all sticks, leaves and other things which will float on water are removed from the gravel and pass out through the tailings discharge spout with the current of water. The openings 25 at the lower head and below the level of the tailings spout prevent the accummulation of floating articles at the rear and drive them forwardly and upwardly through the gravel to the tailings discharge spout. The unwashed gravel frequently contains hard, dry and tightly packed particles of earth or clay, and these are sometimes of almost the same specific gravity as is the gravel being treated.

With my improved device these particles of earth or clay become thoroughly soaked when passing through the machine through that part of the device in which the water stands, but when they reach that part above the water level, then the incoming jets of water keep continuously agitating the gravel and causing the particles thereof to rub or grind upon each other and at the same time create a current of water flowing over and around all of the surfaces of the earth or clay, tending to carry them away with the water just as rapidly as they are being disintegrated by the water and grinding action, so that before such particles reach the gravel discharge spout they will be wholly disintegrated, broken up and carried away by the water. During this time, of course, the agitation caused by the screw conveyor itself is of material assistance in accomplishing this desirable result.

When the gravel contains particles of coal or shale or the like, which are of somewhat less specific gravity than the gravel, but which are hard and strong and cannot be broken up in the manner hereinbefore described with regard to particles of earth and clay, then during that part of the travel of the material within the tank where a strong stream of water is traveling upwardly through the gravel, and then rearwardly and downwardly between the screw conveyor and the adjacent sides of the tank, these particles of coal or shale will roll toward the tailings discharge spout on top of the layer of gravel and between the screw conveyor and the sides of the tank, and in that part of the tank above the water level when these particles have once been separated from the mass by the agitation and currents of water passing upwardly through the gravel, they will not again become mixed with the mass, because they will have a substantially clear passageway to the tailings discharge spout between the side of the tank and the screw conveyor, and in these relatively narrow spaces there will be strongly moving currents of water.

It is therefore of importance in my improved device that, in the part of the tank above the water level, strong currents of water be forced in from the bottom, and that also there be narrow spaces between the sides of the conveyor and the interior of the tank through which the strong currents of water may pass with sufficient velocity to carry with them particles of coal, shale or the like that have been separated from the mass by the water and agitation.

I claim as my invention:

1. In a device of the class described, the combination of a body portion having a tailings discharge spout at one end near the top and a gravel discharge spout at the other end near the bottom, the receiving end of the tank being shaped to hold water at the level of the tailings discharge spout, and the other portion being inclined upwardly above the water level toward the gravel discharge spout, a screw conveyor extended longitudinally through the body portion, the parts being so proportioned that water passageways are provided between the sides of the screw conveyor and the adjacent sides of the body portion, means for introducing a series of jets of water through the bottom of the body portion and upwardly through the material being operated on and around the sides of the screw conveyor, some below and some above the water level of the body portion, said parts being so constructed and arranged and the water supply device being of such capacity that currents of water will be forced upwardly through the layer of gravel below the screw conveyor and then may flow uninterruptedly upwardly and around the sides of the screw conveyor and carry with them between the sides of the conveyor and the sides of the tank toward the tailings discharge spout particles of such material contained in the gravel as are of substantially less specific gravity than the gravel itself, while the washed gravel is being delivered to the discharge spout against the currents of water moving toward the overflow spout.

2. In a device of the class described, the combination of a tank, a head for one end of the tank, a shaft extended through said head, a bearing for the shaft mounted on the outer side of the head, a packing gland mounted in the head and having a shaft projected through it, a device fixed to the inner face of the head and formed with an opening substantially larger than the shaft and through which the shaft is projected, means for supplying a current of water flowing through said opening and into the interior of the tank, and a bearing for the other end of said shaft, said bearing having a removable top member, said parts being so arranged that when the removable top member is removed and the said packing gland is removed, the shaft may be removed by tilting the upper end of the shaft upwardly while it is being withdrawn longitudinally and upwardly, the space around the shaft through which water flows into the body portion being designed to perform the additional function of permitting the upward tilting of the shaft so that it may be removed.

3. In a device of the class described, the combination of a sheet metal body portion having a water discharge opening in its bottom, a water pipe extended longitudinally of the tank adjacent to said water opening, a fitting having its upper surface shaped to fit the contour of the tank and its lower surface shaped to fit the contour of the top of the water pipe, both being designed to receive gaskets, there being water passageways formed in the pipe and in said fitting, and a second fitting formed on the under side of the pipe, and bolts extended through the tank and both of said fittings, for the purposes stated.

THEODORE AULMANN.